(12) United States Patent
Borrelli et al.

(10) Patent No.: US 10,613,340 B2
(45) Date of Patent: Apr. 7, 2020

(54) ENGINEERED ANTIGLARE SURFACE TO REDUCE DISPLAY SPARKLE

(71) Applicant: Corning Incorporated, Corning, NY (US)

(72) Inventors: Nicholas Francis Borrelli, Elmira, NY (US); Jacques Gollier, Redmond, WA (US); Ellen Marie Kosik Williams, Painted Post, NY (US); James Andrew West, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 491 days.

(21) Appl. No.: 15/358,880

(22) Filed: Nov. 22, 2016

(65) Prior Publication Data
US 2017/0075127 A1     Mar. 16, 2017

Related U.S. Application Data

(62) Division of application No. 13/466,267, filed on May 8, 2012, now Pat. No. 9,535,280.
(Continued)

(51) Int. Cl.
*G02B 27/42* (2006.01)
*G02F 1/1335* (2006.01)
(Continued)

(52) U.S. Cl.
CPC ....... *G02B 27/4205* (2013.01); *G02B 5/0221* (2013.01); *G02B 5/0278* (2013.01);
(Continued)

(58) Field of Classification Search
CPC ........ G02B 5/02–0289; G02B 1/10–19; G02B 2005/1804; G02B 27/4205; G02B 27/42;
(Continued)

(56) References Cited

U.S. PATENT DOCUMENTS 5,513,025 A * 4/1996 Watanabe .......... G02B 27/4244
349/106
5,872,654 A * 2/1999 Shirochi ................ G02B 27/46
345/32
(Continued)

FOREIGN PATENT DOCUMENTS

CN     1831071       9/2006
CN     1831071 A     9/2006
(Continued)

OTHER PUBLICATIONS

Jacque Gollier, et al., U.S. Appl. No. 61/447,242, filed Feb. 28, 2011.
(Continued)

*Primary Examiner* — William R Alexander
(74) *Attorney, Agent, or Firm* — Kevin M. Johnson (57) ABSTRACT

A transparent substrate having an antiglare surface with reduced display sparkle. The transparent substrate has a roughened antiglare surface and a diffraction element below the antiglare surface. The diffraction element reduces sparkle by filling gaps between sub-pixels in a pixelated display with orders of diffraction. A display system comprising the transparent substrate and a pixelated display is also provided.

25 Claims, 7 Drawing Sheets

Related U.S. Application Data (60) Provisional application No. 61/490,706, filed on May 27, 2011.

(51) Int. Cl.
  *G02B 5/02* (2006.01)
  *G02B 5/18* (2006.01)

(52) U.S. Cl.
  CPC ......... *G02B 5/0294* (2013.01); *G02B 5/1814* (2013.01); *G02F 1/133502* (2013.01); *G02F 1/133504* (2013.01); *G02B 2005/1804* (2013.01); *G02F 2001/133562* (2013.01); *G02F 2201/38* (2013.01); *G02F 2203/03* (2013.01); *G02F 2203/22* (2013.01)

(58) Field of Classification Search
  CPC .... G02B 5/022; G02B 5/0278; G02B 5/0294; G02B 5/1814; G02F 2001/133562; G02F 2001/38; G02F 1/133502; G02F 1/133504; G02F 2203/03; G02F 2203/22
  USPC ....................................................... 359/609
  See application file for complete search history.

(56) References Cited

U.S. PATENT DOCUMENTS

| | | | |
|---|---|---|---|
| 6,583,932 B1 | 6/2003 | George et al. | |
| 6,677,703 B2 | 1/2004 | Ito | |
| 8,877,104 B2 | 11/2014 | Iwata et al. | |
| 9,454,031 B2* | 9/2016 | Gollier | G02F 1/133504 |
| 9,535,280 B2* | 1/2017 | Borrelli | G02F 1/133502 |
| 9,995,944 B2* | 6/2018 | Sitter | G02B 27/4216 |
| 2005/0237611 A1 | 10/2005 | Osawa | |
| 2007/0242362 A1 | 10/2007 | Takada et al. | |
| 2009/0022948 A1 | 1/2009 | Takemoto et al. | |
| 2009/0147365 A1 | 6/2009 | Inokuma | |
| 2009/0190377 A1 | 7/2009 | Wang | |
| 2010/0026930 A1 | 2/2010 | Jepsen | |
| 2010/0085642 A1* | 4/2010 | Drinkwater | F21V 33/006 |
| | | | 359/567 |
| 2010/0134733 A1 | 6/2010 | Watanabe | |
| 2010/0246008 A1* | 9/2010 | Murata | G02B 5/1814 |
| | | | 359/576 |
| 2010/0246016 A1* | 9/2010 | Carlson | C03C 15/00 |
| | | | 359/599 |
| 2010/0309554 A1 | 12/2010 | Nagal | |
| 2011/0062849 A1* | 3/2011 | Carlson | C03C 3/093 |
| | | | 313/110 |
| 2011/0090697 A1 | 4/2011 | Matsuzaki | |
| 2011/0279900 A1 | 11/2011 | Wang | |
| 2012/0300307 A1* | 11/2012 | Borrelli | G02F 1/133502 |
| | | | 359/609 |
| 2013/0127689 A1* | 5/2013 | Gollier | G02F 1/133504 |
| | | | 345/32 |
| 2018/0313981 A1* | 11/2018 | Cobb | G02B 27/0101 |

FOREIGN PATENT DOCUMENTS

| | | |
|---|---|---|
| CN | 101251608 | 5/2011 |
| CN | 101251608 B | 5/2011 |
| CN | 101650447 B | 12/2011 |
| CN | 101850447 | 12/2011 |
| CN | 102385164 | 3/2012 |
| CN | 102385164 A | 3/2012 |
| JP | 2002189107 | 7/2002 |
| JP | 2002189107 A | 7/2002 |
| WO | 2010141261 | 12/2010 |
| WO | 2010141261 A2 | 12/2010 |

OTHER PUBLICATIONS

Jacques Gollier, et al., U.S. Appl. No. 61/447,285, filed Feb. 28, 2011.
Jacques Gollier, et al., U.S. Appl. No. 61/490,678, filed May 27, 2011.
ASTM Procedure D1003, "Standard Test Method for Haze and Luminous Transmittance of Transparent Plastics".
ASTM Procedure D5767, "Standard Test Methods for Instrumental Measurements of Distinctness-of-Image Gloss of Coating Surfaces".
Huckaby, Darren K.P., "Sparkle" of Anti-Glare Surfaces, 2009 SID International Symposium; Society for Information Display, vol. XXXX, May 31, 2009, pp. 511-513.
CN201280025962.1 Search Report dated Oct. 14, 2015.
PCT/US2012/038778 Search Report dated Nov. 22, 2012.
PCT/US2012/038778 IPRP dated Dec. 12, 2013.
English Translation of CN201280025982.1 Search Report dated Apr. 7, 2016.
Jacque Goliier, et al., U.S. Appl. No. 61/447,242, filed Feb. 28, 2011.
Jacques Gollier, et al., U.S. Appl, No. 61/447,265, filed Feb. 28, 2011.
Jacque Gollier, et al., U.S. Appl. No. 61/490,678, filed May 27, 2011.
ASTM Procedure D1003; "Standard Test Method for Hase and Luminous Transmittance of Transparent Plastics".
Huckaby, Darren K.P., "Quantifying "Sparkle" of Anti-Glare Surfaces"; 2009 SID International Symposium, Society for Information Display, vol. XXXX, May 31, 2009, pp. 511-513.
English Translation of CN201280025962.1 Search Report dated Apr. 7, 2016.

\* cited by examiner

ENGINEERED ANTIGLARE SURFACE TO REDUCE DISPLAY SPARKLE

CROSS-REFERENCE TO RELATED APPLICATIONS

This is a divisional, and claims the benefit of priority under 35 U.S.C. § 120, of U.S. patent application Ser. No. 13/466,267, filed on May 8, 2012, which claims the benefit of priority under 35 U.S.C. § 119 of U.S. Provisional Application Ser. No. 61/490,706 filed on May 27, 2011, the contents of which are relied upon and incorporated herein by reference in their entirety.

BACKGROUND

The disclosure relates to transparent substrates and devices having antiglare properties. More particularly, the disclosure relates to transparent substrates and devices having structures that reduce sparkle in an image generated by a pixelated display.

Pixelated displays such as liquid crystal displays (LCDs) and organic light emitting diodes (OLEDs) are widely used in a variety of information, communication, and entertainment devices. Such displays often include an antiglare treatment, such as a film, coating, or surface to enhance viewability of the display by reducing the specular reflection of ambient light.

Display "sparkle" or "dazzle" is a generally undesirable side effect that can occur when introducing antiglare or light scattering surfaces into a pixelated display system. Sparkle is associated with a very fine grainy appearance of the display, and the pattern of grains may appear to shift with changing viewing angle of the display. Display sparkle may be manifested as bright, dark, and/or colored spots at approximately the pixel-level size scale.

SUMMARY

A transparent substrate having an antiglare surface with reduced sparkle is provided. The transparent substrate has a roughened antiglare surface and a diffraction element on the opposite surface of or within the substrate. The diffraction element is an optical element that modifies light according to the laws of diffraction and may comprise a periodic grating, a quasiperiodic grating, an aperiodic grating, or a random phase pattern that reduces sparkle by filling gaps between sub-pixels in a pixelated display. A display system comprising the transparent substrate and a pixelated display is also provided. The transparent substrate and display system may be used in electronic information, communication, and entertainment devices.

Accordingly, one aspect of the disclosure is to provide a transparent substrate comprising an antiglare surface and a diffraction element disposed below the antiglare surface, wherein the transparent substrate, when disposed in front of a pixelated display, at least partially reduces inter-pixel gaps in the pixelated display.

A second aspect of the disclosure is to provide a display system. The display system comprises: a pixelated display comprising a plurality of pixels, each of the plurality of pixels having a pixel size; a transparent substrate disposed in front of and substantially parallel to the pixelated display, the transparent substrate having an antiglare surface distal from the pixelated display; and a diffraction element disposed between the antiglare surface and the pixelated display.

These and other aspects, advantages, and salient features will become apparent from the following detailed description, the accompanying drawings, and the appended claims.

DETAILED DESCRIPTION

In the following description, like reference characters designate like or corresponding parts throughout the several views shown in the figures. It is also understood that terms such as "top," "bottom," "outward," "inward," and the like are words of convenience and are not to be construed as limiting terms. In addition, whenever a group is described as either comprising or consisting of at least one of a group of elements and combinations thereof, it is understood that the group may comprise or consist of any number of those elements recited, either individually or in combination with each other. Unless otherwise specified, a range of values, when recited, includes both the upper and lower limits of the range and any sub-ranges therebetween. As used herein, the indefinite articles "a," "an," and the corresponding definite article "the" mean "at least one" or "one or more," unless otherwise specified. The drawings are not necessarily to scale, and certain features and certain views of the drawings may be shown exaggerated in scale or in schematic in the interest of clarity and conciseness.

Figure 1:
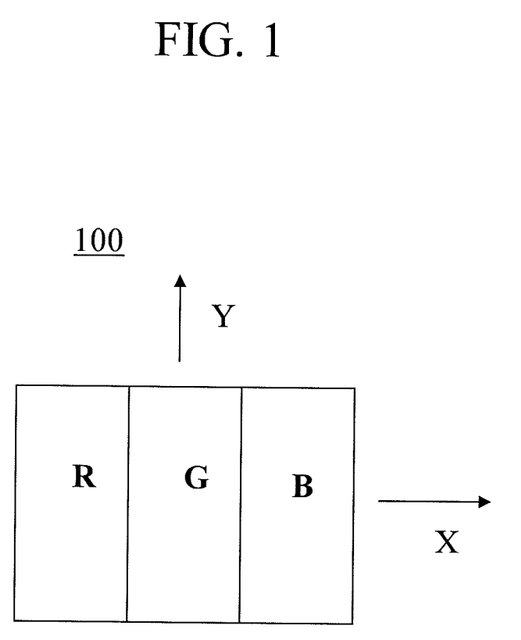
FIG. 1 is a schematic representation of a pixel comprising rectangular red, green, and blue sub-pixels.

Referring to the drawings in general and to FIG. 1 in particular, it will be understood that the illustrations are for the purpose of describing particular embodiments and are not intended to limit the disclosure or appended claims thereto.

Display "sparkle" or "dazzle" is a generally undesirable side effect that can occur when introducing antiglare or light scattering surfaces into a pixelated display system such as, for example, a liquid crystal display (LCD), an organic light emitting diode (OLED), touch screens, reflective displays, or the like. The display system may include active-matrix, passive-matrix, and/or static displays, such as printed images. Such display sparkle differs in type and origin from the type of "sparkle" or "speckle" that has been observed and characterized in projection or laser systems. Sparkle is associated with a very fine grainy appearance of the display, and the pattern of grains may appear to shift with changing viewing angle of the display. Display sparkle may be manifested as bright, dark, and/or colored spots at approximately the pixel-level size scale.

Antiglare surfaces are often used in such pixelated display applications to avoid or reduce specular reflection of ambient light. These antiglare surfaces are typically formed by providing the surface with some degree of roughness to spread the light reflected by the surface over a certain angle. This may be accomplished, for example, by applying a film having a roughened surface or texture, or by roughening the native surface of the substrate.

In pixelated displays such as LCD displays or the like, color images are generally created by using adjacent red (R), green (G), and blue (B) pixels. In a non-limiting example, FIG. 1 shows a schematic representation of a pixel 100 comprising rectangular red (R), green (G), and blue (B) sub-pixels whose sizes are approximately one third of the size (or pitch) of pixel 100 in the X direction and are equal to the size of pixel 100 in the Y direction. As a consequence of this type of geometry, single color (i.e., red, blue, or green) images constitute sub-pixels with a gap of about ⅔ of the pixel size. This inter-pixel gap is responsible for creating some degree of sparkle in images generated by a plurality of pixels 100. If no inter-pixel gap were present or perceived by a viewer, sparkle would not be observed, regardless of the roughness of the antiglare surface. It will be appreciated by those skilled in the art that the present disclosure encompasses pixel and sub-pixel geometries other than that shown in FIG. 1. Other pixel geometries include, but are not limited to: sub-pixels of unequal dimensions (e.g. a blue sub-pixel that is twice as large as the red and green sub-pixels to compensate for low-brightness of a blue light source); non-rectangular sub-pixels; pixels with more than three sub-pixels, including sub-pixels of non-standard colors (e.g. RGB plus white); sub-pixels in which their may be further subdivisions within each sub-pixel; and sub-pixels that are arranged in configurations that have more complex symmetry than that shown in FIG. 1.

Figure 2:
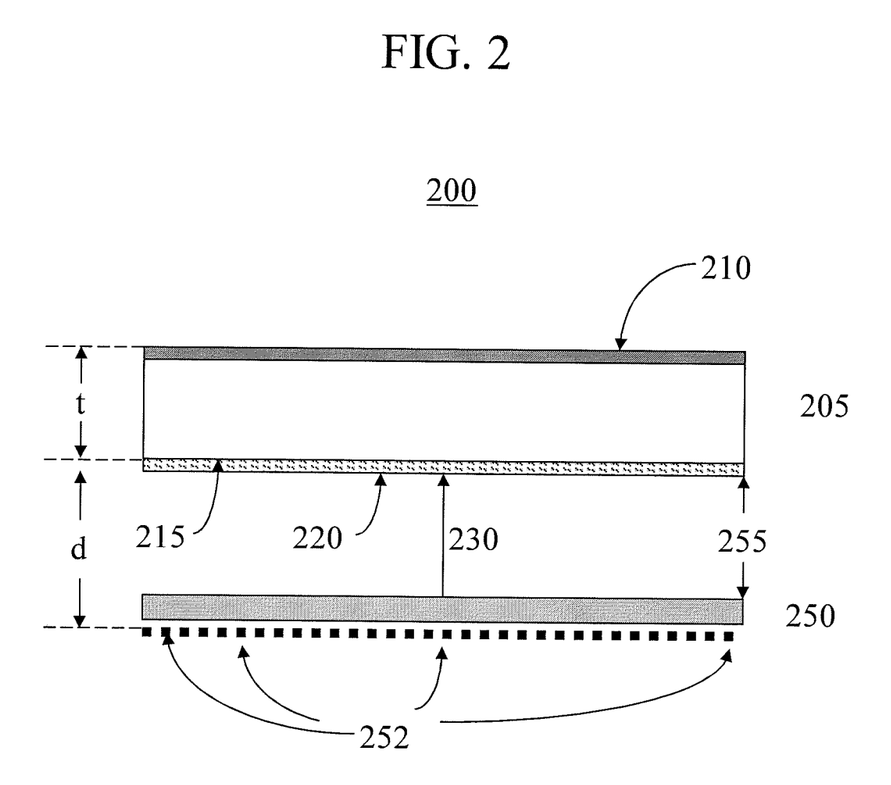
FIG. 2 is a cross-sectional schematic view of a display system comprising a transparent substrate and a pixelated display.

In one aspect, a transparent substrate (also referred to herein as a "substrate") comprising an antiglare surface and a diffraction element is provided. In some embodiments, the substrate comprises a transparent sheet of polymeric material such as, but not limited to, a polycarbonate sheet or the like. In other embodiments, the substrate comprises a transparent glass sheet. The transparent substrate may be a flat sheet or a three dimensional sheet such as, for example, a curved sheet. In another aspect, a display system comprising the transparent substrate described herein and a pixelated display is provided. A cross-sectional schematic view of such a display system comprising a transparent substrate and a pixelated display is shown in FIG. 2. Display system 200 comprises a transparent substrate 205 and a pixelated display 250. Transparent substrate 205 is disposed in front of pixelated display 250 along optical path 230. In some embodiments, transparent substrate is substantially parallel to pixelated display 250. Transparent substrate 205 has a thickness t, an antiglare surface 210, and a diffraction element 220 disposed below antiglare surface 210. In the embodiment shown in FIG. 2, diffraction element 220 is disposed on a second surface 215 opposite antiglare surface 210. In some embodiments, diffraction element 220 is disposed in a polymeric film or epoxy layer, which is disposed on second surface 215. In other embodiments, diffraction element 220 is disposed in the bulk of transparent substrate 205 and between antiglare surface 210 and second surface 215. Pixelated display 250 may be a LCD display, an OLED display, or the like that are known in the art, and is separated from glass substrate 205 comprises a plurality of pixels 252. Pixelated display 250 is separated from transparent substrate 205 by gap 255, and plurality of pixels 252 is separated from diffraction element 220 by optical distance d.

Antiglare surface 210 is a roughened surface that blurs a reflected image to some degree. In some embodiments, antiglare surface 210 comprises a coated or structured polymeric film (often a polarizing film) which is directly laminated to the surface of the transparent substrate 205. In other embodiments, antiglare surface 210 may be formed by chemically etching a surface of the transparent substrate 200, either directly or through an acid- or alkali-resistant mask. When transparent substrate 205 is placed in front of pixelated display 250, antiglare surface 210 is located along optical path 230 and is distal from pixelated display 250 such that antiglare surface 210 faces the viewer.

The amplitude of sparkle is a function of many parameters. Sparkle generally decreases when antiglare surface 210 contains mostly high spatial frequencies or when the distance separating antiglare surface 210 from the plurality of pixels 252 is smaller. As such, there is an interest of using antiglare surfaces having high spatial frequencies. As these spatial frequencies increase, however, the haze of the antiglare surface also increases, resulting in poor contrast of pixelated display 250. To solve this dilemma, both the antiglare surface 210 and second surface 215 of transparent substrate 205 may be roughened. Front antiglare surface 210 has spatial frequencies that are sufficiently low to avoid the creation of haze but high enough to blur reflected images. Second surface 215 has mostly higher spatial frequencies so as to minimize sparkle that may be created by front antiglare surface 210. In addition, second surface 215 may comprise an antireflective coating or layer or an index-matching epoxy to avoid additional haze created by reflections on second surface 215.

In addition to haze and sparkle, display resolution should also be considered. As the spatial frequencies of the back face are increased to eliminate sparkle, the energy of the light emitted by a single pixel is spread over a larger area; i.e., the size of the pixel viewed through the transparent substrate 205 becomes larger and may decrease the sharpness of an image. To avoid visible degradation of image quality, the amplitude in which light from the pixel is spread should be smaller than the human eye resolution (about 1 arc-minute). For a hand-held device where the observer is typically located about one half meter from the screen, for example, the energy should be spread over a distance smaller than 0.15 mm in all directions.

The texture of second surface 215, in some embodiments, may be random or comprise a microlens array, random phase pattern, or other diffraction elements such as periodic structures, periodic gratings, quasiperiodic gratings, aperiodic gratings, or the like disposed on the second surface 215. Periodic structures provide better control over the manner in which light and energy from the plurality of pixels is spread by transparent substrate 210. In the particular case where the pixels are arranged as described on FIG. 1, second surface 215 should have a texture that spreads light along the X direction. In this configuration, the greatest degree of sparkle reduction may be achieved without compromising too much image resolution by using a diffraction element comprising a periodic structure such as, for example, a grating having its principle axis aligned along the X-axis of the pixels.

When transparent substrate 205 is placed in front of a pixelated display 250, diffraction element 220 is located along optical path 230 and is located between antiglare surface 210 and pixelated display 250 such that, when viewed through diffraction element 220 (and antiglare surface 210), the gap between pixels in an image generated by pixelated display 250 is reduced. In one embodiment, the gap is reduced to less than about one third the length (or width) of the individual pixels. In some embodiments, the gap is not visible to the unaided human eye.

For the purpose of illustrating the function of diffraction element 220 and the underlying concept, a diffraction element 220 in which most of the energy passing through diffraction element 220 is diffracted into the orders −1, 0 and +1 is considered. It is assumed that the diffraction efficiency is mostly equal for the 3 orders of diffraction and that diffraction happens along the X axis (FIG. 1).

Figure 3A:
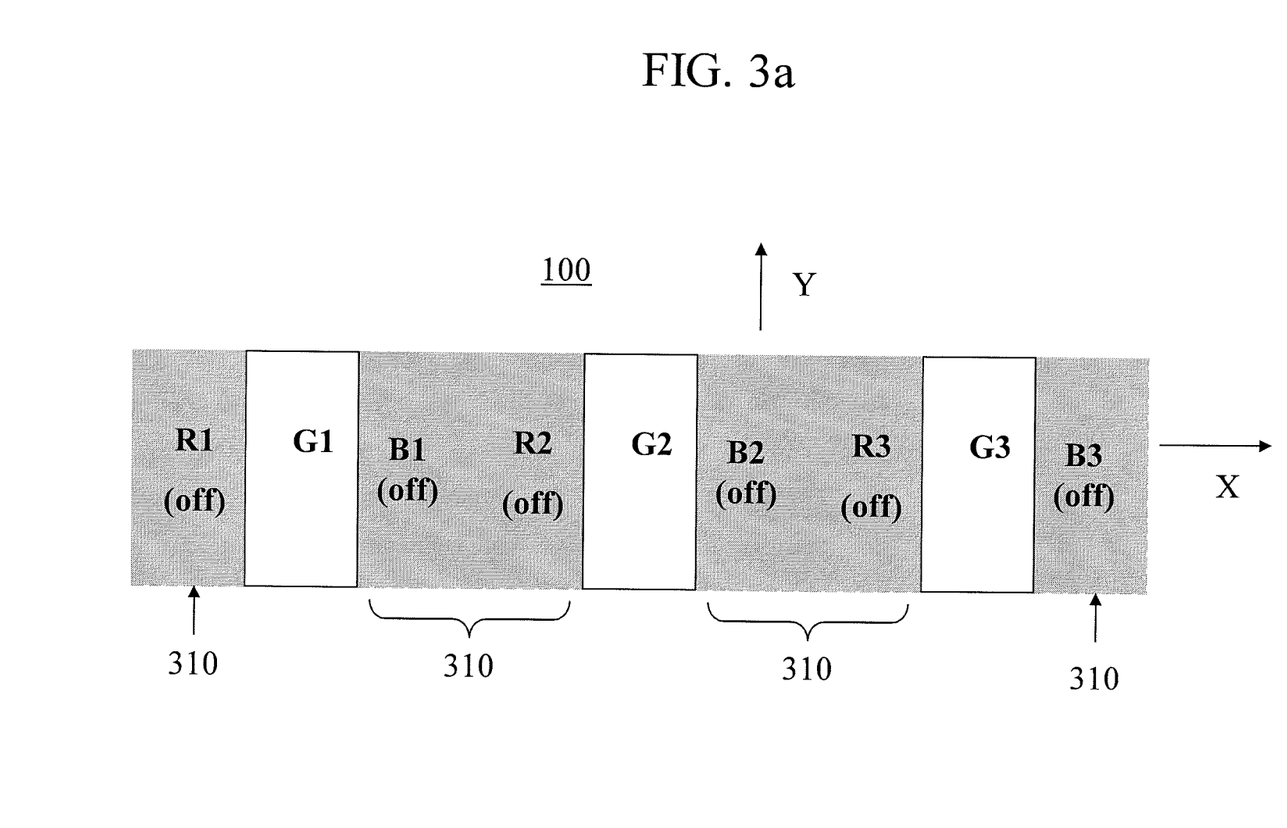
FIG. 3a is a schematic representation of a group of pixels, viewed through a transparent substrate that does not comprise a diffraction element, in which green sub-pixels are energized and red and blue sub-pixels are not energized.
Figure 3B:
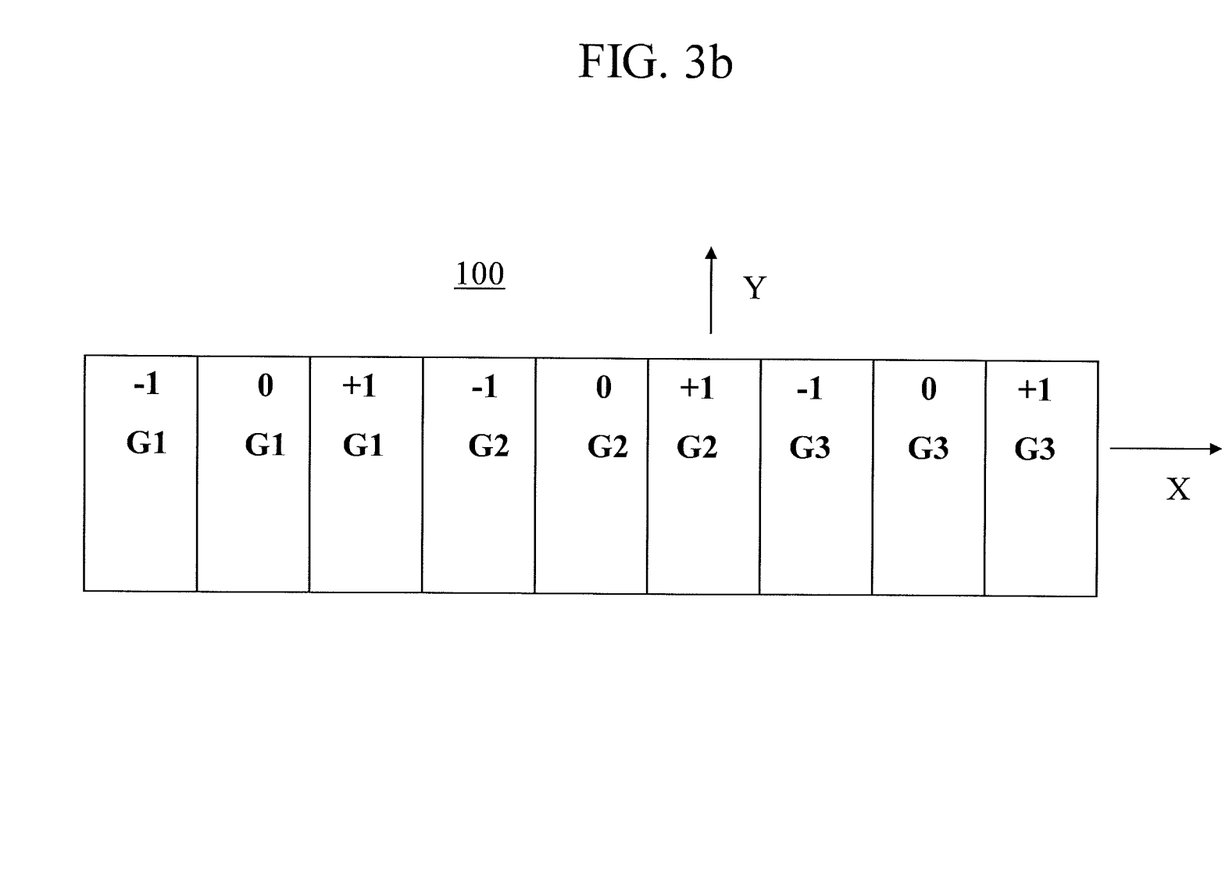
FIG. 3b is a schematic representation of a group of pixels, viewed through a transparent substrate comprising a diffraction element, in which green sub-pixels are energized and red and blue sub-pixels are not energized.

When diffraction element 220 is inserted into optical path 230, each sub-pixel (FIG. 1) in pixelated display 250 is duplicated into 3 images corresponding to the 3 orders of diffraction. Those duplicate images are shifted along the X-axis (FIG. 1) by an amplitude or displacement equal in first approximation to:

$$dx = D \cdot \tan(\theta) \qquad (1),$$

where $\theta = \lambda/T$, dx is the lateral displacement, D is the optical distance from the pixel 255 (FIG. 2) to the diffraction element 220, $\theta$ is the diffraction angle, $\lambda$ is the wavelength, and T is the diffraction grating period. The optical distance 255 is equal to the physical distance multiplied by the optical refractive index of the region spanned by the distance d (FIG. 1). The case in which the diffraction grating period T is selected such that the lateral shift dx equals a third of the pixel size is schematically shown in FIGS. 3a and 3b. In FIGS. 3a and 3b, green sub-pixels G1, G2, and G3 are energized or in the 'on' condition, while red sub-pixels R1, R2, and R3 and blue sub-pixels B1, B2, and B3 are not energized or in the 'off' condition. In the absence of diffraction element 220 (FIG. 3a), gaps 310, which create sparkle in the viewed image, are perceived between sub-pixels G1, G2, and G3. When diffraction element 220 is placed in optical path 230 (FIG. 3b), the gap between sub-pixels is filled by the −1 and +1 orders of diffraction for sub-pixels G1, G2, and G3, and the inter-pixel gap 310—or separation—disappears. While inter-pixel gaps 310 in FIG. 3a are present in the X direction, such inter-pixel gaps may, in some embodiments, exist in the Y direction, and may be filled in a manner similar to that described hereinabove.

The diffraction element impacts resolution of the image viewed through the transparent substrate, and sparkle reduction should be balanced against pixel blurring. Accordingly, the diffraction grating period T may be selected to provide a lateral displacement dx that is either slightly greater than or slightly less than (i.e., within ±10% of) ⅓ of the pixel size in order to balance sparkle reduction and blurring.

Experiments indicate that optimal sparkle reduction is achieved when the gap between the pixels is perfectly matched by the diffraction period. To achieve this, the displacement dx must be equal to one third of the single color pixel pitch, or size (Pitch). The diffraction grating period T is then given by the equation:

$$T = 3D \cdot \lambda / \text{Pitch} \qquad (2).$$

Depending on the application, however, such a grating period may lead to significant image quality degradation. The amount of degradation may be reduced by setting $3D \cdot \lambda/\text{Pitch}$ (equation (2)) as a lower limit for the grating period T and setting twice the value of equation (2) ($6D \cdot \lambda/\text{Pitch}$) as the upper limit:

$$3D \cdot \lambda/\text{Pitch} < T < 6D \cdot \lambda/\text{Pitch} \qquad (3).$$

Equations (2) and (3) can be extrapolated to periodic structures having more than 3 orders of diffraction. In that case, equation (3) becomes:

$$k \cdot D \cdot \lambda/\text{Pitch} < T < 2k \cdot D \cdot \lambda/\text{Pitch} \qquad (4),$$

where k represents the main diffraction orders diffracted by the structure.

In some embodiments, diffraction element 220 comprises a periodic grating or texture disposed on second surface 215 of substrate 200. As illustrated hereinabove, the periodic grating may have a grating period that is obtained by solving equation (1) when dx is equal to one third of the size of a pixel present in pixelated display 250. In other embodiments, diffraction element 220 may comprise a quasiperiodic grating, an aperiodic grating, or a random phase pattern.

Figure 4:
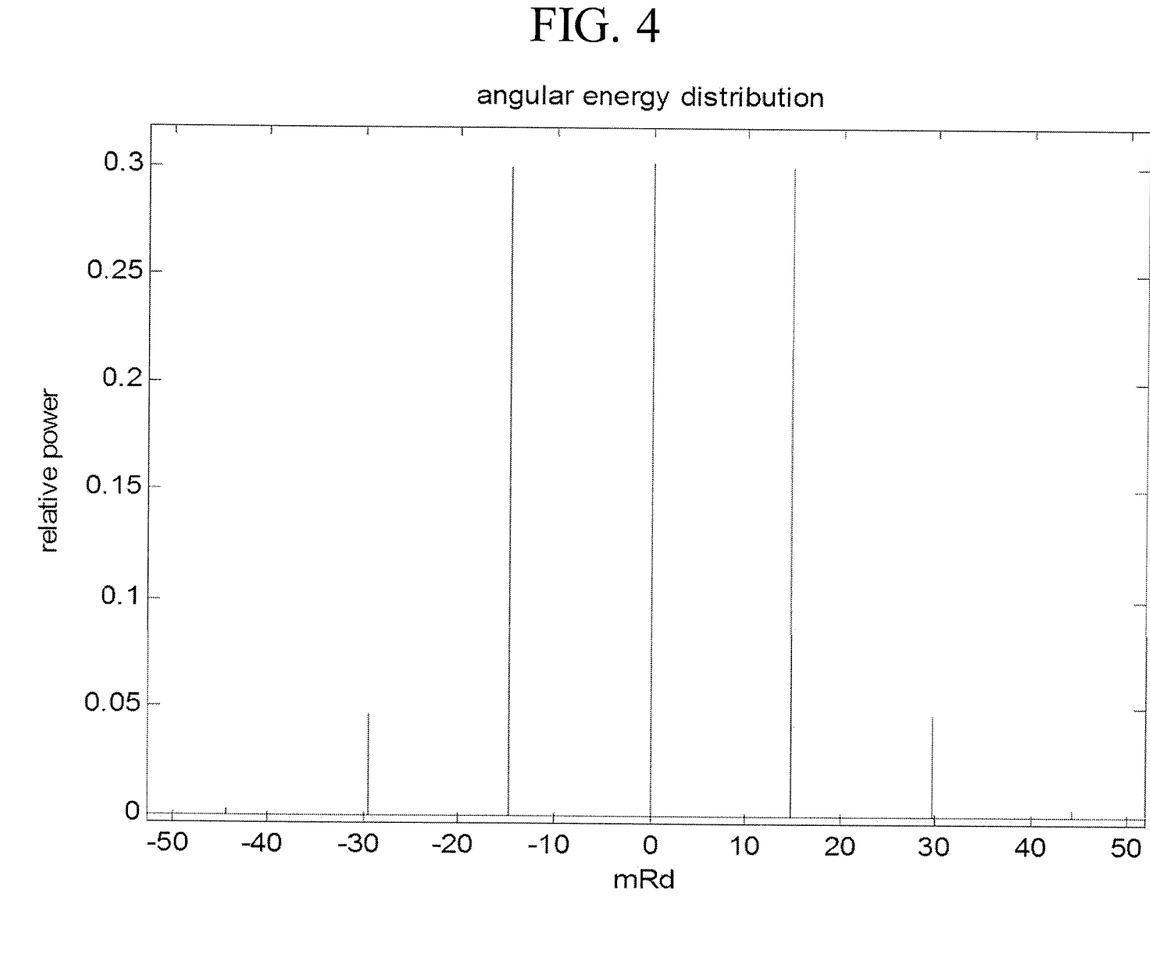
FIG. 4 is a plot of angular energy distribution scattered by a sinusoidal grating for green light.

To achieve optimal sparkle reduction, the image seen through the diffraction element should be as homogeneous as possible. In a three order diffraction grating, this may be achieved by having all three diffraction orders be equal in amplitude. FIG. 4 shows, for example, the diffraction efficiency for a sinusoidal grating with a phase modulation peak-to-valley (PTV) amplitude of 0.45 PTV (in units of $2\pi$). Such a grating would be used in a display system with a pixel size of 100 microns and d=2.256 mm. Pixel power/energy is equally distributed between the three diffraction orders, which contain about 90% of the diffracted power/energy. Similar diffraction efficiencies may be achieved with square-shaped gratings having a modulation amplitude of 0.32 PTV.

When the periodic structure has more than three orders of diffraction, the extreme orders of diffraction must have higher amplitudes than the central orders in order to achieve the same homogeneous image spread.

Typical grating periods corresponding to different types of displays are listed in the Table 1 for gratings having three orders of diffraction. The grating period has been calculated for a wavelength $\lambda$ of 0.53 μm.

TABLE 1

Grating periods for different types of displays.

| Display type | Optical distance D (mm) | Pixel pitch (mm) | Grating period (microns) |
|---|---|---|---|
| Laptop | 1 | 0.191 | 8.35 to 16.2 |
| Hand held device | 2.4 | 0.194 | 19.8 to 39.6 |
| Retina display | 1.2 | 0.078 | 24.5 to 49 |

Optical distance D in Table 1 was measured using a microscope objective. The microscope is first focused at a first position P1 to bring the pixels in the pixelated display into focus. The focus is then adjusted to a second position P2, which corresponds to the last surface of the LCD display stack. The optical distance is defined as the difference between the first and second positions (P2−P1) and takes the indices of refraction of the material inside the LCD stack into account.

In those instances in which the diffraction grating has a sinusoidal shape and the grating index contrast is 0.5, the optimal amplitude of the diffraction orders is around 0.48 μm in all three cases listed in Table 1. In the case of a square-shaped grating, the ideal amplitude is 0.34 μm and the grating duty factor is close to or about 50%.

Although the examples described in Table 1 above were calculated assuming that diffraction element 220 was obtained by surface texturing, diffraction element 220 may also comprise components having bulk scattering properties.

For example, diffraction element 220 may comprise a portion of transparent substrate 200 in which the index of refraction of the transparent substrate 205 has been modified (for example, by ion exchange of a glass substrate through a mask) so as to create local variations in the index of refraction. When light propagates through the substrate, those local variations may induce some phase modulation into the optical waves, thus creating diffraction effects similar to surface texturing.

In high resolution displays, for example, the pixel size is about 75 µm. Optimizing the parameters of display system 200 for green (around 532 nm) and assuming an optical distance d from the pixel 252 to diffraction element 220 (FIG. 2) of 3 mm, the diffraction angle is 8.3 mRd (0.48 degrees) corresponding to a grating period of 63.8 µm. Assuming an air gap 255 with refractive index n=1 between pixelated display 250 and that the diffraction element comprises a periodic sinusoidal grating, the optimum amplitude of the roughness is 0.48 µm, which corresponds to a relatively shallow surface profile (i.e., the grating amplitude is about one hundredth of the grating period).

In other embodiments, diffraction element 220 comprises a random phase pattern. The random phase pattern may have a cutoff frequency such that the diffusion angular energy distribution is a rectangular distribution with a diffraction cone equal to the pixel size divided by distance d from the pixel 252 to diffraction element 220 (FIG. 2).

The efficiency and diffraction angle of diffraction element 220 will be different for the each of the three pixel colors. Since the photopic response of the human eye is much higher in green than in the other colors (i.e., red, blue), about 70% of the brightness in a white image is created by green sub-pixels. As such, it is generally desirable to optimize the parameters of diffraction element 220 and display system 200 for green and accept slightly lower resolution and higher sparkle in red and blue.

Figure 5:
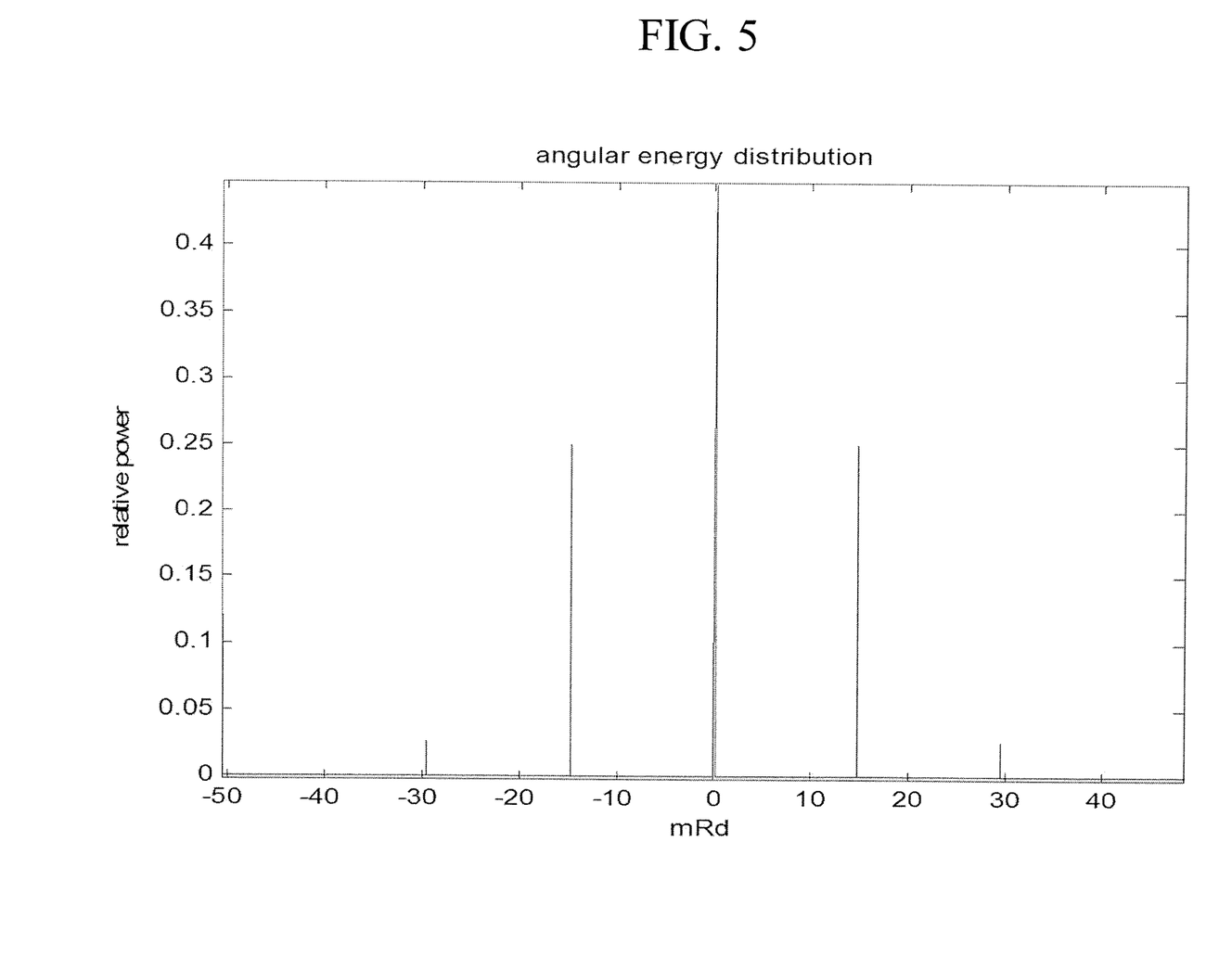
FIG. 5 is a plot of angular energy distribution scattered by a sinusoidal grating for red light.

Assuming that the display system 200 has been optimized around green (532 nm), the diffracted energy distribution for red (632 nm) light is plotted in FIG. 5. The efficiency for diffraction element 220 in red is 45% in the 0 order, as compared to 25% in the −1 and +1 orders. Although the sparkle will be reduced, the reduction will not be as efficient as in green.

Diffraction element 220 may be applied to second surface 215 of substrate 200 as a polymeric film. Alternatively, diffraction element 220 may be formed on—and integral to—second surface 215.

In some embodiments, gap 255 is filled with epoxy (not shown) so as to contact second surface 215 and adhere or bond transparent substrate 205 to pixelated display 250. The epoxy has a refractive index that partially matches that of transparent substrate 205 in order to eliminate Fresnel reflections on second surface 215 and front face 252 of pixelated display. The epoxy has a refractive index that differs from that of diffractive element 220 and an index contrast that is sufficiently low to attenuate the Fresnel reflection. At the same time, the index contrast of the epoxy is large enough to keep the roughness amplitude of the diffraction element at reasonable levels. With an index contrast of 0.05, for example, the amplitude of the Fresnel reflection is around 0.04% and the ideal grating amplitudes are 4.8 µm and 3.4 µm for sinusoidal and square gratings, respectively. Given relatively large periods on the order of 20 µm to 40 µm, such amplitudes are achievable for grating manufacturing processes such as microlithography, embossing, replication, or the like.

In some embodiments, antiglare surface 210 has a RMS amplitude of at least about 80 nm. In some embodiments, antiglare surface is integral to the body of glass substrate 200; i.e., antiglare surface 210 is part of glass substrate 200, being formed by chemical or other etching processes.

Depending on the process that is used to form antiglare surface 210, the antiglare surface 210 may, in some embodiments, not be completely covered by roughened features; i.e., antiglare surface 210 may not be homogenous. When the surface of the transparent substrate is etched through a mask deposited on the surface, for example, holes are created at locations on the surface where openings in the mask exist. Consequently, a portion of the substrate surface is not etched and the roughness is not homogeneously distributed throughout or on the surface. This unetched portion of antiglare surface 210 is not roughened and is therefore relatively smooth and flat. The unetched portion may, in some embodiments, comprise up to about 20% of antiglare surface 210 and, in other embodiments, the unetched portion may comprise up to about 10% of antiglare surface 210, with the roughened portion comprising the remaining portion of antiglare surface 210. Such antiglare surfaces are described in U.S. Provisional Patent Application No. 61/490,678, entitled "Transparent Glass Substrate having Antiglare Surface," filed May 27, 2011, by Jacques Gollier et al., the contents of which are incorporated by reference herein in their entirety.

In some embodiments, antiglare surface 210 has a first RMS roughness Rlong of up to about 300 nm measured in a range of lateral spatial periods (sometimes referred to as surface wavelength) from about 40 µm to about 640 µm, a second RMS surface roughness Rshort measured at lateral spatial periods of less than about 20 µm, and a third RMS roughness Rtotal, measured without surface wavelength filtering, in a range from about 60 nm up to about 600 nm, wherein the ratio (Rlong/Rshort) is less than about 3.9. Such antiglare surfaces are described in U.S. Provisional Patent Application No. 61/447,242 entitled "Glass having Antiglare Surface with Low Display Sparkle," filed Feb. 28, 2011, by Jacques Gollier et al., the contents of which are incorporated by reference herein in their entirety.

As used herein, the terms "pixel power deviation" and "PPD" refer to the quantitative measurement for display sparkle. PPD is calculated by image analysis of display pixels according to the following procedure. A grid box is drawn around each display pixel. The total power within each grid box is calculated from camera data and assigned as the total power for each pixel. The total power for each display pixel thus becomes an array of numbers, for which the mean and standard deviation may be calculated, and the PPD value is defined as the standard deviation of total power per pixel divided by the mean power per pixel (times 100). The total power collected from each display pixel by the camera is measured and the standard deviation of total pixel power (PPD) is calculated across the measurement area, which typically comprises about 30×30 LCD pixels.

The details of a measurement system and image processing calculation that are used to obtain PPD values are described in U.S. Provisional Patent Application No. 61/447,285, filed on Feb. 28, 2011, by Jacques Gollier et al., and entitled "Apparatus and Method for Determining Sparkle," the contents of which are incorporated by reference herein in their entirety.

When disposed in front of a pixelated display such as pixelated display 250 at a predetermined distance $d_1$ from the imaging plane of pixelated display 250 (FIG. 2), transparent substrate 205 has a pixel power deviation of less than about 7.5%.

In some embodiments, pixelated display 250 exhibits a second PPD separate and independent from transparent substrate 205. When transparent substrate 205 is combined with the pixelated display 250, the PPD of the transparent substrate is less than about 4% greater than the second PPD. In other embodiments, the PPD of the transparent substrate is less than about two times greater than the second PPD.

Figure 6:
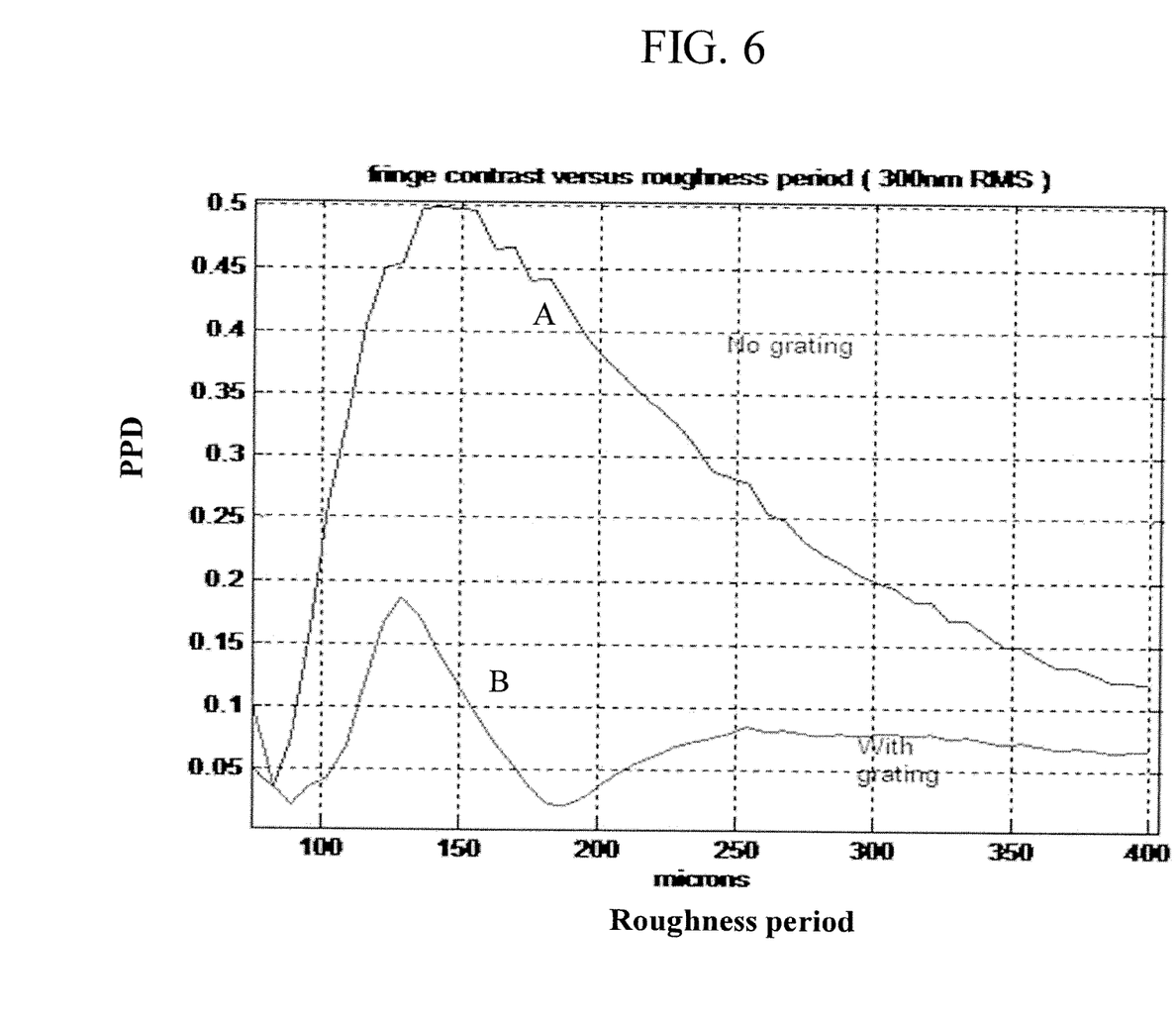
FIG. 6 is a plot of pixel power deviation (PPD) as a function of the period of a roughened antiglare surface.

FIG. 6 is a plot of PPD as a function of the period of a roughened antiglare surface. PPD is calculated assuming that the antiglare surface is a sinusoidal function versus the period of the antiglare surface. Line A in FIG. 6 was calculated based on the condition that a diffraction element such as those described herein is not present on the second surface of the transparent substrate, and line B in FIG. 6 was calculated based on the condition that a diffraction element such as those described herein is present on the second surface of the transparent substrate. FIG. 6 shows that the presence of the diffraction element on the second surface of the transparent substrate can significantly decrease the overall amount of PPD, even at those roughness periods/frequencies (about 130 μm in FIG. 6) where the diffraction coating generates sparkle.

As used herein, the term "distinctness of image (DOI)" is defined by method A of ASTM procedure D5767 (ASTM 5767), entitled "Standard Test Methods for Instrumental Measurements of Distinctness-of-Image Gloss of Coating Surfaces," the contents of which are incorporated herein by reference in their entirety. In accordance with method A of ASTM 5767, glass reflectance factor measurements are made on the at least one roughened surface of the glass sheet at the specular viewing angle and at an angle slightly off the specular viewing angle. The values obtained from these measurements are combined to provide a DOI value. In some embodiments, the transparent substrate 205 described herein has a 20° distinctness of image of less than about 85 and, in other embodiments, less than about 80.

As used herein, the term "transmission haze" refers to the percentage of transmitted light scattered outside an angular cone of about ±2.5° in accordance with ASTM procedure D1003, entitled "Standard Test Method for Haze and Luminous Transmittance of Transparent Plastics," the contents of which are incorporated herein by reference in their entirety. In some embodiments, transparent substrate 205 described herein has a transmission haze of less than about 20%.

The transparent substrate described herein may comprise an ion exchangeable glass which, in some embodiments, is strengthened by either chemical or thermal means that are known in the art. In one embodiment, the transparent substrate is chemically strengthened by ion exchange. In this process, metal ions at or near a surface of the glass are exchanged for larger metal ions having the same valence as the metal ions in the glass. The exchange is generally carried out by contacting the glass with an ion exchange medium such as, for example, a molten salt bath that contains the larger metal ion. The metal ions are typically monovalent metal ions such as, for example, alkali metal ions. In one non-limiting example, chemical strengthening of a glass substrate containing sodium ions by ion exchange is accomplished by immersing the glass substrate in an ion exchange bath comprising a molten potassium salt such as potassium nitrate ($KNO_3$) or the like.

The replacement of small metal ions by larger metal ions in the ion exchange process creates in a region in the glass that extends from the surface to a depth (referred to as the "depth of layer") that is under compressive stress. This compressive stress at the surface of the transparent substrate is balanced by a tensile stress (also referred to as "central tension") within the interior of the glass substrate. In some embodiments, the surface of the transparent substrate described herein, when strengthened by ion exchange, has a compressive stress of at least 350 MPa, and the region under compressive stress extends to a depth of layer of at least 15 μm below the surface.

In some embodiments, the transparent substrate described herein comprises a soda lime glass, an alkali aluminosilicate glass, or an alkali aluminoborosilicate glass. In one embodiment, the transparent substrate comprises an alkali aluminosilicate glass that comprises alumina, at least one alkali metal and, in some embodiments, greater than 50 mol %, $SiO_2$, in other embodiments, at least 58 mol %, and in still other embodiments, at least 60 mol % $SiO_2$, wherein the ratio $$\frac{Al_2O_3(\text{mol \%}) + B_2O_3(\text{mol \%})}{\sum \text{alkali metal modifiers (mol \%)}} > 1,$$

where the modifiers are alkali metal oxides. This glass, in particular embodiments, comprises, consists essentially of, or consists of: about 58 mol % to about 72 mol % $SiO_2$; about 9 mol % to about 17 mol % $Al_2O_3$; about 2 mol % to about 12 mol % $B_2O_3$; about 8 mol % to about 16 mol % $Na_2O$; and 0 mol % to about 4 mol % $K_2O$, wherein the ratio $$\frac{Al_2O_3(\text{mol \%}) + B_2O_3(\text{mol \%})}{\sum \text{alkali metal modifiers (mol \%)}} > 1,$$

where the modifiers are alkali metal oxides.

In another embodiment, the transparent substrate comprises an alkali aluminosilicate glass which comprises, consists essentially of, or consists of: about 61 mol % to about 75 mol % $SiO_2$; about 7 mol % to about 15 mol % $Al_2O_3$; 0 mol % to about 12 mol % $B_2O_3$; about 9 mol % to about 21 mol % $Na_2O$; 0 mol % to about 4 mol % $K_2O$; 0 mol % to about 7 mol % MgO; and 0 mol % to about 3 mol % CaO.

In yet another embodiment, the transparent substrate described herein comprises an alkali aluminosilicate glass comprising, consisting essentially of, or consisting of: about 60 mol % to about 70 mol % $SiO_2$; about 6 mol % to about 14 mol % $Al_2O_3$; 0 mol % to about 15 mol % $B_2O_3$; 0 mol % to about 15 mol % $Li_2O$; 0 mol % to about 20 mol % $Na_2O$; 0 mol % to about 10 mol % $K_2O$; 0 mol % to about 8 mol % MgO; 0 mol % to about 10 mol % CaO; 0 mol % to about 5 mol % $ZrO_2$; 0 mol % to about 1 mol % $SnO_2$; 0 mol % to about 1 mol % $CeO_2$; less than about 50 ppm $As_2O_3$; and less than about 50 ppm $Sb_2O_3$; wherein 12 mol % ≤ $Li_2O$+$Na_2O$+$K_2O$ ≤ 20 mol % and 0 mol % ≤ MgO+CaO ≤ 10 mol %.

In still another embodiment, the transparent substrate described herein comprises an alkali aluminosilicate glass which comprises, consists essentially of, or consists of: about 64 mol % to about 68 mol % $SiO_2$; about 12 mol % to about 16 mol % $Na_2O$; about 8 mol % to about 12 mol % $Al_2O_3$; 0 mol % to about 3 mol % $B_2O_3$; about 2 mol % to about 5 mol % $K_2O$; about 4 mol % to about 6 mol % MgO; and 0 mol % to about 5 mol % CaO, wherein: 66 mol % $SiO_2$+$B_2O_3$+CaO ≤ 69 mol %; $Na_2O$+$K_2O$+$B_2O_3$+MgO+CaO+SrO > 10 mol %; 5 mol % ≤ MgO+CaO+SrO ≤ 8 mol %;

$(Na_2O+B_2O_3)-Al_2O_3 \leq 2$ mol %; 2 mol % $\leq Na_2O-Al_2O_3 \leq 6$ mol %; and 4 mol % $\leq (Na_2O+K_2O)-Al_2O_3 \leq 10$ mol %.

In other embodiments, the transparent substrate described herein comprises a glass comprising $SiO_2$, $Al_2O_3$, $P_2O_5$, and at least one alkali metal oxide ($R_2O$), wherein $0.75 \leq [(P_2O_5$ (mol %)+$R_2O$ (mol %))/$M_2O_3$ (mol %)]$\leq 1.2$, where $M_2O_3=Al_2O_3+B_2O_3$. In some embodiments, $[(P_2O_5$ (mol %)+$R_2O$ (mol %))/$M_2O_3$ (mol %)]=1 and, in some embodiments, the glass does not include $B_2O_3$ and $M_2O_3=Al_2O_3$. The glass comprises, in some embodiments: about 40 to about 70 mol % $SiO_2$; 0 to about 28 mol % $B_2O_3$; about 0 to about 28 mol % $Al_2O_3$; about 1 to about 14 mol % $P_2O_5$; and about 12 to about 16 mol % $R_2O$. In some embodiments, the glass comprises: about 40 to about 64 mol % $SiO_2$; 0 to about 8 mol % $B_2O_3$; about 16 to about 28 mol % $Al_2O_3$; about 2 to about 12 mol % $P_2O_5$; and about 12 to about 16 mol % $R_2O$. The glass may further comprise at least one alkaline earth metal oxide such as, but not limited to, MgO or CaO.

In some embodiments, the glass comprising the transparent substrate described herein is free of lithium; i.e. the glass comprises less than 1 mol % $Li_2O$ and, in other embodiments, less that 0.1 mol % $Li_2O$ and, in other embodiments, o0 mol % $LI_2O$. In some embodiments, such glasses are free of at least one of arsenic, antimony, and barium; i.e. the glass comprises less than 1 mol % and, in other embodiments, less than 0.1 mol % of $As_2O_3$, $Sb_2O_3$, and/or BaO.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure.

The invention claimed is:

1. A transparent substrate comprising an antiglare surface and a diffraction element having a grating period disposed below the antiglare surface, wherein:
the transparent substrate, when disposed in front of a pixelated display, reduces an inter-pixel gap in the pixelated display to less than about one third the length or width of a pixel present in the pixelated display,
the transparent substrate is separated from the pixelated display by a predetermined distance, and
the grating period is determined at least based on the predetermined distance and the size of the inter-pixel gap.

2. The transparent substrate of claim 1, wherein the diffraction element is disposed on a second surface of the substrate, the second surface being opposite the antiglare surface.

3. The transparent substrate of claim 2, wherein the diffraction element is integral to the second surface.

4. The transparent substrate of claim 2, wherein the diffraction element has a first refractive index and the second surface is in contact with an epoxy layer having a second refractive index that is different from the first refractive index.

5. The transparent substrate of claim 1, wherein the periodic grating has a grating period T and diffraction order k, wherein the periodic grating is separated from a pixel by optical distance D, the pixel emitting light having a wavelength $\lambda$, and wherein $k \cdot D \cdot \lambda/Pitch < T < 2k \cdot D \cdot \lambda/Pitch$.

6. The transparent substrate of claim 5, wherein the grating period T is obtained by solving for the equation $dx=D \cdot \tan(\theta)$, where $\theta=\lambda/T$ and $\theta$ is the diffraction angle, when dx is equal to one third of the size of a pixel present in the pixelated display.

7. The transparent substrate of claim 1, wherein the diffraction element is disposed on a polymeric film which is disposed on the second surface.

8. The transparent substrate of claim 1, wherein the transparent substrate has a second surface opposite the antiglare surface and a bulk portion between the antiglare surface and the second surface, and wherein the diffraction element is disposed in the bulk portion.

9. The transparent substrate of claim 1, wherein the antiglare surface is a roughened surface, having a total RMS roughness Rtotal, measured without surface wavelength filtering, in a range from about 60 nm to about 600 nm.

10. The transparent substrate of claim 9, wherein the roughened surface has a first RMS surface roughness Rlong, measured in a range of lateral spatial periods from about 40 μm to about 640 μm, of up to about 300 nm; and a second RMS surface roughness Rshort, measured at lateral spatial periods of less than about 20 μm, wherein the ratio (Rlong/Rshort) is less than about 3.9.

11. The transparent substrate of claim 1, wherein the transparent substrate has a transmission haze of less than about 20%.

12. The transparent substrate of claim 1, wherein the transparent substrate has a 20° distinctness of image of less than about 85.

13. The transparent substrate of claim 1, wherein the transparent substrate comprises a sheet of polymeric material.

14. The transparent substrate of claim 1, wherein the transparent substrate comprises a glass sheet.

15. The transparent substrate of claim 14, wherein the glass sheet is strengthened.

16. The transparent substrate of claim 14, wherein the glass sheet is strengthened by ion exchange, and wherein the glass sheet has at least one surface having a region under a compressive stress, the region extending from the surface to a depth of layer within the transparent substrate.

17. The transparent substrate of claim 14, wherein the compressive stress is at least about 350 MPa and the depth of layer is at least 15 μm.

18. The transparent substrate of claim 14, wherein the glass sheet comprises one of a soda lime glass, an alkali aluminosilicate glass, and an alkali aluminoborosilicate glass.

19. The transparent substrate of claim 18, wherein the glass comprises at least 2 mol % of $Al_2O_3$ or $ZrO_2$.

20. The transparent substrate of claim 1, wherein the antiglare surface comprises a roughened surface portion having an RMS amplitude of at least about 80 nm, and an unroughened surface portion, wherein the unroughened surface portion forms a fraction of the antiglare surface of up to about 0.1, and wherein the roughened surface portion forms a remaining fraction of the antiglare surface.

21. The transparent substrate of claim 1, wherein a plurality of pixels, each of the plurality of pixels having a pixel size, when viewed through the transparent substrate, has a gap between adjacent pixels of less than two thirds of the pixel size.

22. The transparent substrate if claim 1, wherein the transparent substrate has a pixel power deviation of less than about 7.5% when disposed in front of the pixelated display, the pixelated display having a plurality of pixels and an imaging plane, such that the antiglare surface is distal from the pixelated display and separated from the imaging plane by a predetermined distance.

23. The transparent substrate of claim 22, wherein the transparent substrate has a 20° distinctness of image of less than about 80.

24. The transparent substrate of claim 22, wherein the pixelated display alone has a second pixel power deviation, and wherein pixel power deviation of the transparent substrate combined with the pixelated display is less than about 4% greater than the second pixel power deviation.

25. The transparent substrate of claim 22, wherein the pixelated display alone has a second pixel power deviation, and wherein pixel power deviation of the transparent substrate combined with the pixelated display is less than about two times greater than the second pixel power deviation.

* * * * *

UNITED STATES PATENT AND TRADEMARK OFFICE
CERTIFICATE OF CORRECTION

PATENT NO. : 10,613,340 B2
APPLICATION NO. : 15/358880
DATED : April 7, 2020
INVENTOR(S) : Nicholas Francis Borrelli et al.

It is certified that error appears in the above-identified patent and that said Letters Patent is hereby corrected as shown below:

On the Title Page

On page 2, in Column 2, item (56), Other Publications, Line 16, delete "CN201280025982.1" and insert -- CN201280025962.1 --, therefor.

On page 2, in Column 2, item (56), Other Publications, Line 18, delete "Goliier," and insert -- Gollier, --, therefor.

On page 2, in Column 2, item (56), Other Publications, Line 20, delete "61/447,265," and insert -- 61/447,285, --, therefor.

On page 2, in Column 2, item (56), Other Publications, Line 24, delete "Hase" and insert -- Haze --, therefor.

In the Specification

In Column 12, Line 64, Claim 22, delete "if claim 1," and insert -- of claim 1, --, therefor.

Signed and Sealed this
Tenth Day of January, 2023

Katherine Kelly Vidal
*Director of the United States Patent and Trademark Office*